United States Patent [19]

Senape

[11] Patent Number: 5,059,315

[45] Date of Patent: Oct. 22, 1991

[54] AQUARIUM WATER AERATION AND FILTERING SYSTEM

[76] Inventor: Saverio Senape, 215 W. 92nd St., New York, N.Y. 10025

[21] Appl. No.: 420,886

[22] Filed: Oct. 13, 1989

Related U.S. Application Data

[63] Continuation-in-part of Ser. No. 340,786, Apr. 20, 1989, abandoned.

[51] Int. Cl.$^5$ .............................................. C02F 9/00
[52] U.S. Cl. .................................. 210/169; 210/282; 210/290; 210/416.2
[58] Field of Search .................... 210/169, 195.1, 196, 210/266, 282–284, 290, 416.2, 197

[56] References Cited

U.S. PATENT DOCUMENTS 4,186,093  1/1980  Willinger ............................ 210/169
4,678,568  7/1987  Goldman et al. ................... 210/169

Primary Examiner—Ivars Cintins
Attorney, Agent, or Firm—Richard C. Litman

[57] ABSTRACT

A compact device for filtering and aerating aquarium water to sustain diverse aquatic species which comprises a suction pump and a non-submerged column of different filtering layers and in which water is initially dispersed into fine droplets that are given room to fall freely till water degasification is completed.

4 Claims, 1 Drawing Sheet

AQUARIUM WATER AERATION AND FILTERING SYSTEM

CROSS-REFERENCE TO RELATED APPLICATIONS

This application is a Continuation-In Part Application (CIP) of application Ser. No. 07/340,786 filed Apr. 20, 1989, now abandoned.

FIELD OF THE INVENTION

This invention relates to a submerged apparatus for maintaining the bulk of aquarium water sufficiently pure and aerated to sustain diverse species of fish and invertebrates by interrupting the continuity of the liquid medium within the apparatus in order to enhance mass transfer and prevent biological filter clogging.

BACKGROUND OF THE INVENTION

A modern aquarium hobbyist is usually interested in all facets of aquatic life. The problem regularly encountered by the owners of small and medium size tanks of 20 gallons or less is that water conditions therein are extremely unstable. Slight overfeeding, filter clogging or even statistical fluctuation in the pH and red ox potential ruin whatever delicate equilibrium there may be in the tank. Obviously, the immobile invertebrates such as corals are the most vulnerable species to any adverse local changes in the environment since they are incapable of adjusting their position. Conventional gravity trickle down columns where water is pumped from the bottom layers and is allowed to seep down through a stack of filters have proved to be inefficient as purifying and aerating systems unless the column is so high that it becomes cumbersome in a medium size aquarium. Another drawback of these devices is that they have no provisions for an intensive removal of dissolved noxious gases that are the products of a fish metabolism. Besides, in all conventional aquarium maintenance systems the filtering media are constantly immersed in water which facilitates the accumulation and growth of algae even at a high flow rate of water in the tank and through the filter. This clogging is yet another major intrinsic problem of gravitational filters along with a relatively slow gas transfer through a small gas-liquid interface. These difficulties are compounded by the additional fact that in order to preserve his or her delicate species, the hobbyist has to consider the position of the filter in the tank or the vibrations caused by a necessarily powerful pump.

SUMMARY OF THE INVENTION

By the present invention, an improved aquarium water maintenance system is provided wherein surface layers of water are adiabatically sucked into a sealed filtering container through a fine mesh plate that breaks the water into droplets. The droplets are let fall through a gas separation chamber till they touch the upper filtering layer. Seeping through layers that include, but are not limited to, floss, diatomaceous earth, activated charcoal, nitrate anion exchange resin and calcite filters, the water is sufficiently purified to be fed back to the tank via a sump at the bottom of the aquarium.

The present invention utilizes the principles of enhancing gas-liquid mass transfer by using vacuum suction to force aquarium water into a container through a fine mesh cover thereof. The top of the device is submerged in the oxygen-enriched surface layer of the tank. In addition, when water is being sucked into the unit through the apertures in its top cover, it forms natural vortices that trap air into the device. Breaking the continuity of the liquid medium results in a "rain" of fine droplets. Their highly developed surface area, combined with a negative pressure maintained within the container, creates ideal conditions for degasification of water. On the other hand, the air trapped by incoming water maintains sufficient partial pressure of oxygen to prevent any appreciable impoverishment of droplets. The device allows for attaining an oxygen content in water of ca. 9 ppm compared to 4 ppm maintained by conventional aeration devices. Evolving metabolic gases leave the container through the apertures where the water film in the water vortexes offers the lowest mass-transfer resistance. Degasified droplets fall onto the first partially wet filtering layer. Powerful suction however prevents rapid coalescence and therefore drastically reduces biological clogging of the filtering media while ensuring a high flow rate of the device. Purified water is collected in the sump chamber at the bottom of the container and continuously bled into the lower layers of aquarium water which are the most depleted of oxygen and contaminated with byproducts of aquatic life cycles. Upward currents of salubrious water reliably sustain even the most delicate species. The direction of water currents is particularly important in a small aquarium where the mobility of fish specimens is severely limited. Only upward streams let a specimen stand relatively still with open gill and still receive enough oxygen for its normal biological functions.

Accordingly, one of the objects of the present invention is to provide a compact filtering and aeration column for creating a stable environment suitable for sustaining a wide variety of aquatic species in a small-to-medium size aquarium.

It is another object of the invention to provide an aquarium water treatment apparatus that combines in one unit filtering and degasification of water.

A further object of this invention is to provide an aquarium maintenance unit with high flow rate of water that will reduce clogging of filters by algae and ensure uniform water conditions throughout the bulk of water in the aquarium.

It is yet another object of this invention to provide an aquarium water treatment unit the performance of which is independent of the position thereof.

With these and other objects and advantages in view, the nature of the invention will be better understood as illustrated and claimed with reference being made to the attached drawings.

BRIEF DESCRIPTION OF THE DRAWINGS

Similar reference characters designate corresponding parts throughout the several figures of the drawings.

DESCRIPTION OF THE PREFERRED EMBODIMENT

Figure 1:
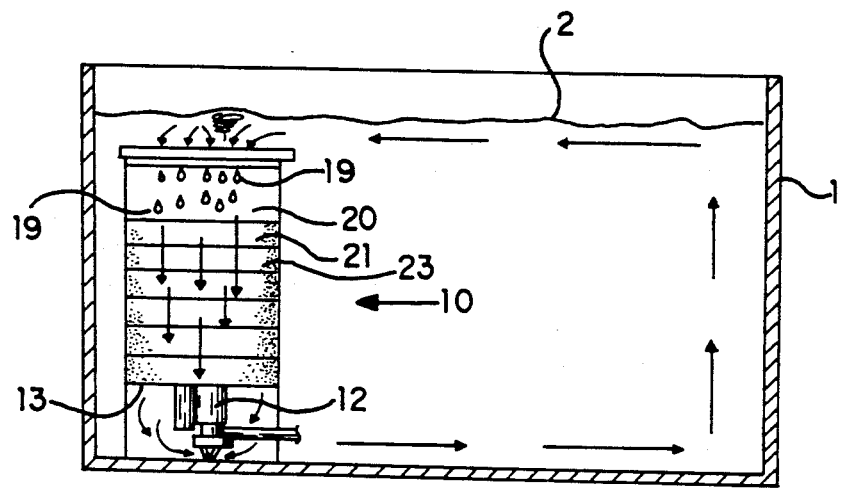
FIG. 1 is a side view of the preferred embodiment of the filtering and aeration device in the aquarium.
Figure 2:
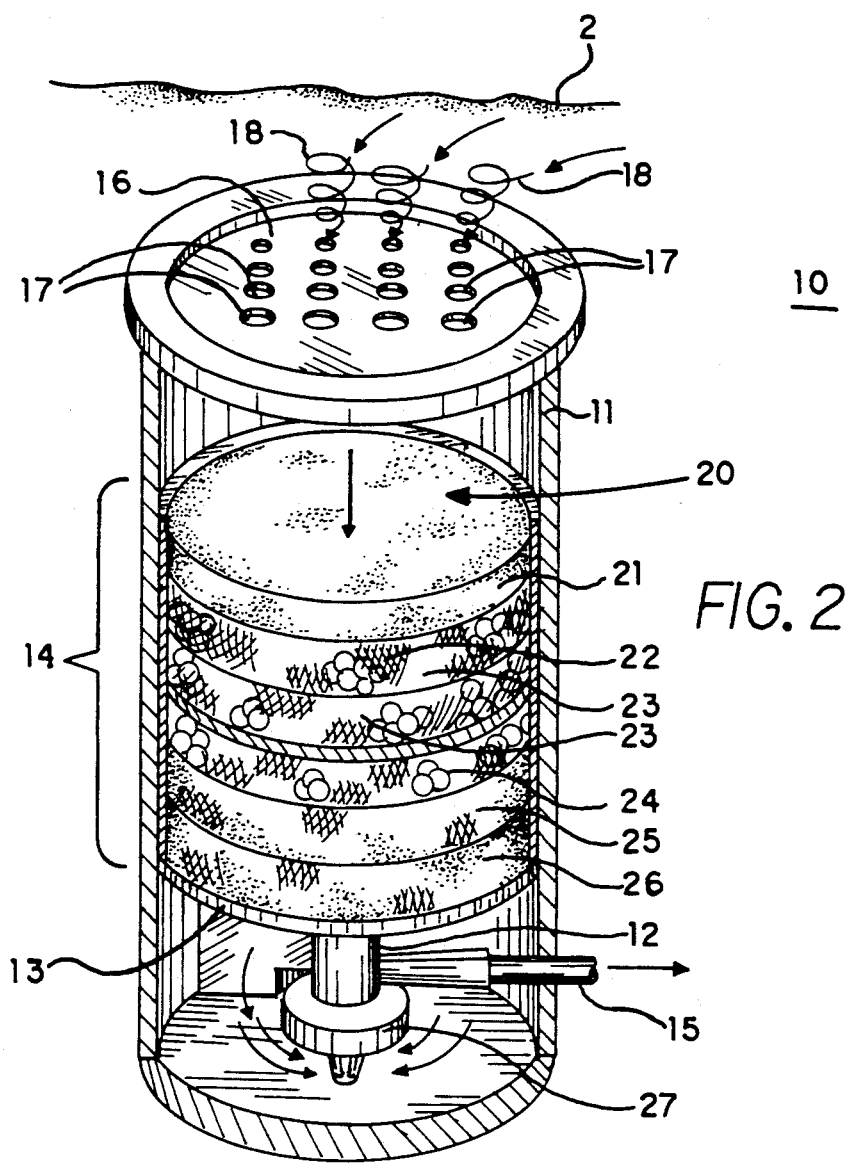
FIG. 2 is a perspective view of the top section of the apparatus where the formation of droplets takes place.

Referring now to the drawings, particularly FIG. 1 showing the preferred embodiment of the invention, the present invention 10 will be understood to relate to a new device for maintaining stable water environment in a home aquarium 1. The filtering and aeration device is contained within a cylindrical casing 11 that is made out of a water-impermeable and preferably transparent plastic. The unit 10 is vertically disposed in the aquarium 1 so that it is completely immersed in water and its top is approximately 0.5 inch below the water level 2.

An electrically driven impeller 12 powered by a battery or an external power source is secured at the bottom of the unit immediately under the perforated floor 13 of the lowest layer of the filtering cartridge 14. The rotation of the vanes of the water-immersed impeller 12 develops suction by imparting centrifugal motion to the water. The delivery head 15 is maintained at a level that ensures a high turnover of water in the aquarium 1. When water is sucked out of the lower section of the filtering cartridge 14, it adiabatically forces an equal volume of water into the unit through its top cover 16. This tightly fitting cover 16 has a plurality of fine apertures 17 through which the well-aerated water from the aquarium surface enters the unit. Every aperture 17 becomes a site of a vortex 18 where water is accelerated and entrains additional air into the casing 11. The apertured cover 16 breaks incoming water into droplets 19. The droplets 19 fall freely through a section of the container 20 where the suction from below maintains a negative pressure. This section 20 serves as a degasification chamber. Metabolic gases dissolved in water evolve therefrom and gradually leave the container 11 as they build up a sufficient pressure to break the water film at the vortices 18. The large liquid-gas interface resulting from the formation of droplets 19 substantially increases the rate of the mass-transfer in the course of water degasification.

Degasified water droplets fall onto the top filtering layer 21 which is usually a 'pillow' of fibrous floss material contained within a loosely woven sack 22. Similar sacks are used for all filtering media in the cartridge 14 because they are convenient for filter replacement.

Water droplets quickly trickle down to the lower filtering layers 23–26. While the rate of flow coming into the unit 10 may be equal or even slightly higher than the outflow rate from the top filtering layer 21, the surface of the latter is so highly porous that it is never completely covered with water. This creates an environment that is adverse to the growth of algae and therefore prevents biological clogging of the filter. The fibrous layer 21 is succeeded by layers of diatomaceous beads 23 and activated charcoal 24, both with very large surface areas and high adsorption capacities. Once most physical impurities have been retained by these filters, the water flows down to a layer of a nitrate anion-exchange resin 25 where chemical purification is accomplished. The bottom filter 26 is composed of calcite which is gradually leached by the water of various trace elements, the maintaining of a certain content of which in the aquarium water is important for sustaining aquatic life. Well aerated, purified water replenished with trace elements is collected in the sump 27 and pumped out of the unit 10 near the bottom of the aquarium where it gradually replaces contaminated water.

It is to be understood that the present invention is not limited to the sole embodiment described above, but encompasses any and all embodiments within the scope of the following claims.

I claim:

1. A self-contained aquarium apparatus for maintaining stable parameters of aquarium water in an aquarium that sustains diverse aquatic species which comprises a casing having a top cover including a plurality of fine apertures therein and a bottom section defining a sump chamber having an opening communicating with the aquarium, a filtering cartridge having a plurality of filtering layers vertically disposed atop the sump chamber and in fluid communication with said sump chamber, a degasification chamber disposed adjacent the top cover and in fluid communication with said filtering cartridge, and a centrifugal pump secured within said sump chamber, wherein said casing containing the degasification chamber, filtering cartridge and sump chamber is completely immersed within the aquarium water and upon activation of the centrifugal pump, water from the top region of the aquarium is drawn through said fine apertures where the water is dispersed into droplets that fall through said degasification chamber and then passes through said filtering cartridge into said sump chamber where purified and aerated water is collected before entering the bottom region of the aquarium.

2. The aquarium apparatus of claim 1 wherein said centrifugal pump comprises an electrically driven impeller having rotating vanes.

3. The aquarium apparatus of claim 1 wherein said filtering cartridge includes layers of floss, diatomaceous earth beads, activated charcoal, anion-exchange resin and calcite.

4. The aquarium apparatus of claim 1 wherein a perforated floor is disposed between said filtering cartridge and said sump chamber.

* * * * *